(12) United States Patent
Yamamoto et al.

(10) Patent No.: US 12,292,095 B2
(45) Date of Patent: May 6, 2025

(54) TORSIONAL-VIBRATION REDUCING DEVICE

(71) Applicant: VALEO KAPEC JAPAN KK, Atsugi (JP)

(72) Inventors: Kiyoshi Yamamoto, Atsugi (JP); Takashi Fujita, Atsugi (JP); Hiroki Yanagisawa, Atsugi (JP)

(73) Assignee: VALEO KAPEC JAPAN KK, Atsugi (JP)

( * ) Notice: Subject to any disclaimer, the term of this patent is extended or adjusted under 35 U.S.C. 154(b) by 238 days.

(21) Appl. No.: 17/998,506

(22) PCT Filed: May 11, 2021

(86) PCT No.: PCT/JP2021/017911
§ 371 (c)(1),
(2) Date: Nov. 11, 2022

(87) PCT Pub. No.: WO2021/230243
PCT Pub. Date: Nov. 18, 2021

(65) Prior Publication Data
US 2023/0193977 A1    Jun. 22, 2023

(30) Foreign Application Priority Data
May 11, 2020  (JP) ................ 2020-083167

(51) Int. Cl.
*F16F 15/123*    (2006.01)
(52) U.S. Cl.
CPC .............. *F16F 15/12313* (2013.01)

(58) Field of Classification Search
CPC .............. F16F 15/123; F16F 15/12313; F16F 15/1232; F16F 15/1234; F16F 15/134;
(Continued)

(56) References Cited

U.S. PATENT DOCUMENTS

| 4,836,350 A | 6/1989 | Kübel et al. |
| 5,772,515 A * | 6/1998 | Yamakawa ......... F16F 15/1343 464/68.3 |

(Continued)

FOREIGN PATENT DOCUMENTS

| DE | 102010018941 A1 * | 12/2010 | .......... F16F 15/1343 |
| DE | 102013224437 A1 * | 6/2014 | .......... F16F 15/1232 |

(Continued)

OTHER PUBLICATIONS

International Search Report issued Aug. 3, 2021 in PCT/JP2021/017911, filed on May 11, 2021, 3 pages.
(Continued)

*Primary Examiner* — Josh Skroupa
(74) *Attorney, Agent, or Firm* — Oblon, McClelland, Maier & Neustadt, L.L.P.

(57) ABSTRACT

A torsional-vibration reducing device includes: an input rotation member, an output rotation member, a coil spring which mitigates torque fluctuation generated at an input side and transmits power to an output side, a spring retaining portion provided on at least one of the input rotation member and the output rotation member and configured to support the coil spring, and a hole formed at a position corresponding to the spring retaining portion in an outer diameter direction with respect to a rotation center line.

3 Claims, 8 Drawing Sheets

(58) Field of Classification Search
CPC ........... F16F 15/13415; F16F 15/13423; F16F 15/1343; F16F 15/13453
USPC ........................................................ 464/67.1
See application file for complete search history.

(56) References Cited

U.S. PATENT DOCUMENTS

| | | | | |
|---|---|---|---|---|
| 8,512,153 | B2* | 8/2013 | Degler | ................ F16F 15/1232 |
| | | | | 464/67.1 |
| 8,696,475 | B2* | 4/2014 | Werner | ................ F16F 15/123 |
| | | | | 464/67.1 |
| 2011/0263340 | A1 | 10/2011 | Degler | |
| 2013/0150168 | A1 | 6/2013 | Werner | |

FOREIGN PATENT DOCUMENTS

| | | | | |
|---|---|---|---|---|
| DE | 10 2017 124 082 A1 | | 4/2019 | |
| EP | 1584839 A1 | * | 10/2005 | ........... F16F 15/1234 |
| EP | 2020535 A2 | * | 2/2009 | ........... F16F 15/1234 |
| FR | 3053089 A1 | * | 12/2017 | ........ F16F 15/12353 |
| JP | 9-126298 A | | 5/1997 | |
| JP | 2004-11820 A | | 1/2004 | |
| JP | 2005-282652 A | | 10/2005 | |
| JP | 2007-9308 A | | 1/2007 | |
| JP | 2012-11295 A | | 1/2012 | |
| JP | 2013-83327 A | | 5/2013 | |
| JP | 2015-112616 A | | 6/2015 | |
| JP | 2016-156416 A | | 9/2016 | |
| JP | 2020-7603 A | | 1/2020 | |
| WO | WO-2008055601 A1 | * | 5/2008 | ........ F16F 15/13453 |
| WO | WO-2017088870 A1 | * | 6/2017 | ........ F16F 15/13453 |

OTHER PUBLICATIONS

Extended European Search Report issued Apr. 5, 2024, in corresponding European Patent Application No. 21803397.5, 5 pages.

* cited by examiner

TORSIONAL-VIBRATION REDUCING DEVICE

TECHNICAL FIELD

The present invention relates to a torsional-vibration-reducing-device manufacturing method and a torsional-vibration reducing device.

BACKGROUND ART

Because an internal combustion engine obtains power by intermittently combusting fuel, torsional vibration (torque fluctuation) occurs. To reduce the torsional vibration, a torsional-vibration reducing device is installed to reduce torque fluctuation generated at an input side of a power transmission path by using an elastic body and transmit power to an output side.

For example, in the case of a torsional-vibration reducing device disclosed in Patent Document 1, a back plate, which is an input rotation member, and a holding plate, which is an output rotation member, may rotate relatively. Further, a plurality of coil springs is interposed between the back plate and the holding plate and fitted by a spring accommodation member.

DOCUMENT OF RELATED ART

Patent Document

Patent Document 1: Japanese Patent Laid-Open No. 2016-156416

DISCLOSURE

Technical Problem

During a process of manufacturing a torsional-vibration reducing device, a damper product including a back plate, a holding plate, and a coil spring as components is assembled, and then the damper product is cleaned by a cleaning solution. However, rotation members of the back plate and the holding plate have no structure for actively discharging the cleaning solution. For this reason, when the damper product is assembled and then cleaned by the cleaning solution, the cleaning solution hardly flows, and the cleaning solution is collected on the rotation member. Therefore, there is a problem in that a large amount of time is required to clean the damper product and remove the cleaning solution.

Further, the torsional-vibration reducing device supports the coil spring in an arc shape by a spring retaining portion provided on the back plate or the holding plate. However, an arc-shaped inner surface of the spring retaining portion is in contact with the entire spring outer peripheral surface of the coil spring over an overall length in a peripheral direction. Therefore, the rotation members of the back plate and the holding plate become heavier. The increase in weight of the rotation member increases a centrifugal force that is applied to the back plate or the holding plate when the back plate or the holding plate rotates. That is, there are problems in that the weight of the rotation member increases, and rotation strength of the rotation member against the centrifugal force decreases.

The present invention has been contrived in consideration of the above-mentioned situations, and an object of the present invention is to provide a torsional-vibration-reducing-device manufacturing method capable of cleaning a damper product and removing a cleaning solution within a short time. Another object of the present invention is to provide a torsional-vibration reducing device capable of reducing a weight of a rotation member and increasing rotation strength of the rotation member against a centrifugal force.

Technical Solution

According to a first aspect according to the present invention, a torsional-vibration-reducing-device manufacturing method includes an input rotation member, an output rotation member, and a coil spring. The torsional-vibration reducing device mitigates torque fluctuation generated at an input side and transmits power to an output side. The torsional-vibration-reducing-device manufacturing method includes a press step, a heat treatment step, and a damper assembly step. The press step forms the input rotation members and the output rotation members by performing punching press processing and bending press processing on a board. The heat treatment step performs the heat treatment on the formed input rotation member and the formed output rotation member. The damper assembly step assembles a damper product including, as components, the heat-treated input rotation member, the heat-treated output rotation member, and the heat-treated coil spring. The press step includes a hole drilling process of making a hole in at least one of the input rotation member and the output rotation member in an outer diameter direction with respect to a rotation center line at a position corresponding to a spring retaining portion for supporting the coil spring. The method includes a cleaning step after the damper assembly step, and a cleaning-solution removing step. The cleaning step cleans the damper product with a cleaning solution. The cleaning-solution removing step removes the cleaning solution remaining after the cleaning of the damper product.

According to a second aspect of the present invention, a torsional-vibration reducing device includes an input rotation member, an output rotation member, and a coil spring. The torsional-vibration reducing device mitigates torque fluctuation generated at an input side and transmits power to an output side. The torsional-vibration reducing device has a spring retaining portion. The spring retaining portion is provided on at least one of the input rotation member and the output rotation member and supports the coil spring. A hole is formed at a position corresponding to the spring retaining portion in an outer diameter direction with respect to a rotation center line.

Advantageous Effects

According to the first aspect of the present invention, it is possible to provide the torsional-vibration-reducing-device manufacturing method capable of cleaning the damper product and removing the cleaning solution within a short time. According to the second aspect of the present invention, it is possible to provide the torsional-vibration reducing device capable of reducing the weight of the rotation member and increasing the rotation strength of the rotation member against a centrifugal force.

BEST MODE

A torsional-vibration reducing device according to an embodiment of the present invention will be described with reference to the drawings. The torsional-vibration reducing device according to the present embodiment refers to a torsional-vibration reducing device that is a long travel damper embedded in a torque converter disposed between an internal combustion engine and a transmission of a vehicle. That is, the torsional-vibration reducing device mitigates torque fluctuation generated at an input side and transmits power to an output side.

First Embodiment

First, a basic configuration of a torsional-vibration reducing device according to the present embodiment will be described with reference to FIGS. 1 to 4.

Figure 1:
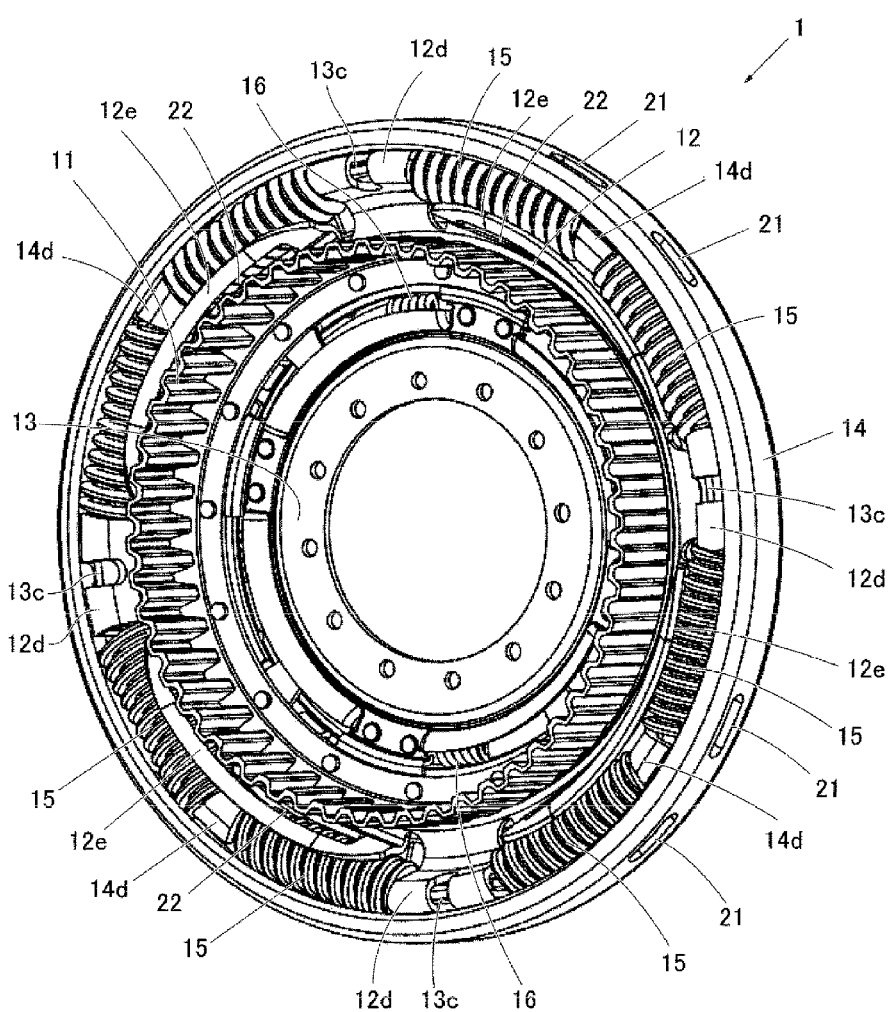
FIG. 1 is a perspective view of a torsional-vibration reducing device according to a first embodiment of the present invention.

As illustrated in FIG. 1, the torsional-vibration reducing device 1 includes a clutch hub 11, an inner peripheral holding plate 12, an input plate 13, a back plate 14 (outer peripheral holding plate), coil springs 15 (vibration absorbing spring), and a plurality of coil springs 16 (stopper means). The clutch hub 11 and the inner peripheral holding plate 12 are output rotation members. The input plate 13 and the back plate 14 are input rotation members. The clutch hub 11, the inner peripheral holding plate 12, the input plate 13, and the back plate 14 are installed side by side in a concentric shape. The inner peripheral holding plate 12 is fixed to the clutch hub 11. The input plate 13 is connected to the back plate 14. The inner peripheral holding plate 12 and the back plate 14 support the coil springs 15.

Figure 3:
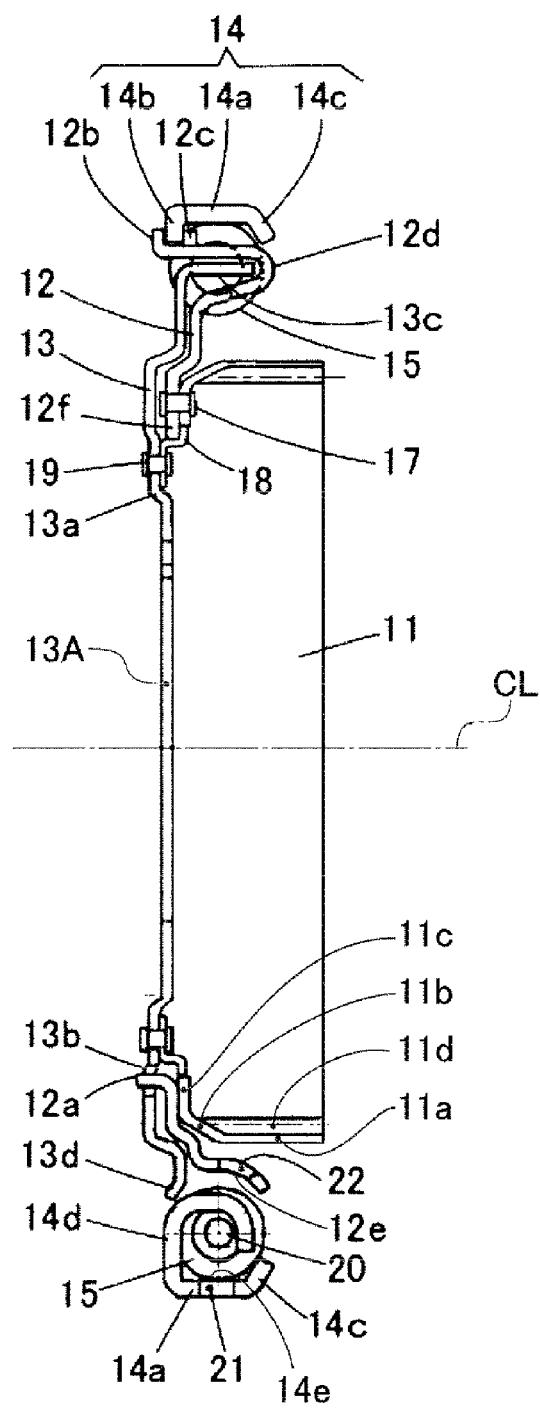
FIG. 3 is a schematic cross-sectional view of a main part of the torsional-vibration reducing device according to the first embodiment of the present invention.

As illustrated in FIG. 3, the clutch hub 11 has a tubular portion 11a, a truncated conical tubular portion 11b, and an annular circular plate portion 11c. The tubular portion 11a has a cylindrical shape extending along a rotation center line CL. The truncated conical tubular portion 11b extends so as to have a diameter that decreases from a depth end of the tubular portion 11a in an axial direction. The annular circular plate portion 11c extends from a small-diameter end of the truncated conical tubular portion 11b in a diameter direction. The clutch hub 11 has a female spline 11d formed on an inner peripheral surface of the tubular portion 11a. The female spline 11d is disposed at a position opposite to a male spline (not illustrated). A multi-plate clutch (not illustrated) is disposed between the female spline 11d and the male spline. The multi-plate clutch is a combination of a drive plate and a driven plate. The drive plate is spline-coupled to the female spline 11d. The driven plate is spline-coupled to the male spline.

Figure 4:
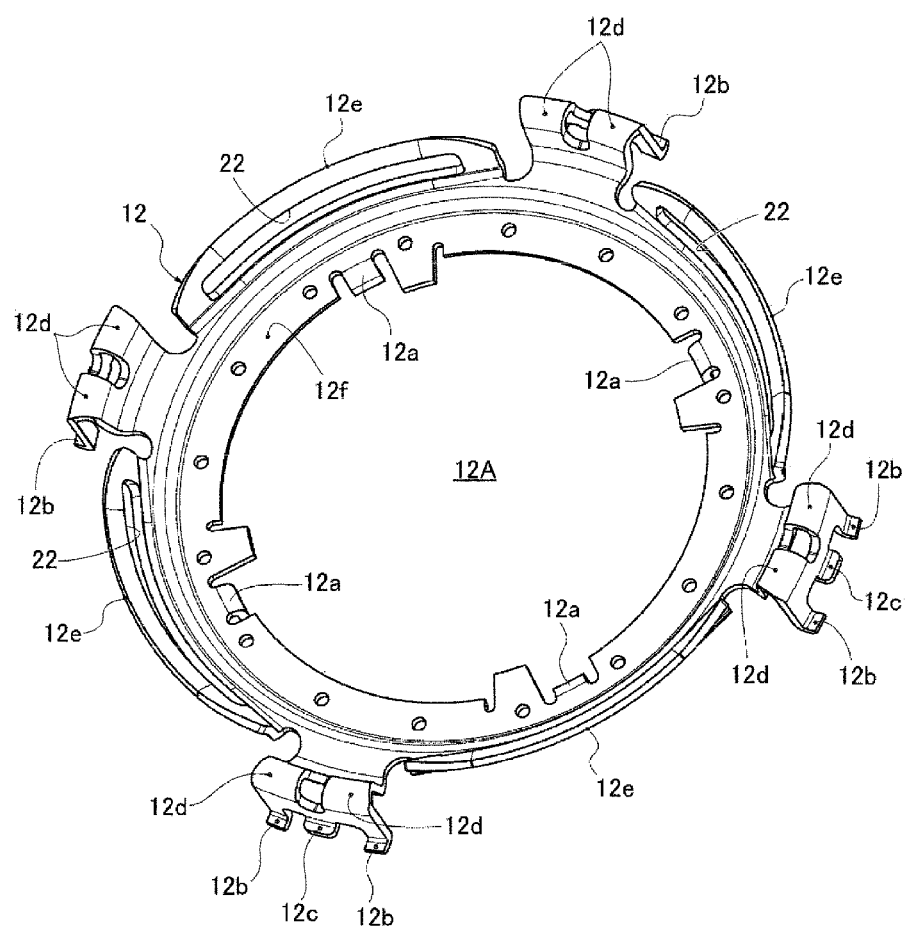
FIG. 4 is a perspective view of an inner peripheral holding plate that is a constituent element of the torsional-vibration reducing device according to the first embodiment of the present invention.

As illustrated in FIGS. 1, 3, and 4, the inner peripheral holding plate 12 is formed in an approximately circularly annular shape. As illustrated in FIG. 3, the inner peripheral holding plate 12 has a circularly annular plate shape (an inner peripheral plate-shaped portion 12f to be described below) which overlaps the annular circular plate portion 11c of the clutch hub 11 in the axial direction. The inner peripheral plate-shaped portion 12f and the annular circular plate portion 11c are fixed by a first rivet 17. The inner peripheral holding plate 12 is installed to be relatively rotatable by a predetermined angle relative to the back plate 14.

As illustrated in FIGS. 1 and 3, the input plate 13 is formed in an approximately circularly annular shape. The input plate 13 is disposed at a position opposite to the inner peripheral holding plate 12 in the axial direction. The input plate 13 is installed to be relatively rotatable by a predetermined angle without being spaced apart from the inner peripheral holding plate 12.

Next, a configuration of a main part of the torsional-vibration reducing device 1 will be described with reference to FIGS. 1 to 4.

The inner peripheral holding plate 12 has a center hole 12A, bent pieces 12a, outer guide portions 12b, inner guide portions 12c, first spring accommodation portions 12d, first spring retaining portions 12e, and inner peripheral plate-shaped portions 12f. The bent piece 12a protrudes in a direction (axial direction) of the input plate 13 from an edge of a center hole 12A of the inner peripheral holding plate 12. The bent piece 12a is inserted into a catching hole 13b of the input plate 13 while having a predetermined play stroke. The outer guide portion 12b is disposed outside of the back plate 14 based on the axial direction. The inner guide portion 12c is disposed inside the back plate 14 based on the axial direction. The outer guide portions 12b extend from eight points of an outer peripheral edge of the inner peripheral holding plate 12. The inner guide portions 12c extend from four points of the outer peripheral edge of the inner peripheral holding plate 12. Eight outer guide portions 12b are installed, and four inner guide portions 12c are installed. Four first spring accommodation portions 12d are installed at the same interval at outer peripheral positions of the inner peripheral holding plate 12. The first spring accommodation portion 12d is formed in a curved shape (a U shape) from a position extending outward in the diameter direction. Four first spring retaining portions 12e are installed at the same interval at outer peripheral positions of the inner peripheral holding plate 12. That is, the four (plurality of) first spring retaining portions 12e are separated. The first spring retaining portions 12e and the first spring accommodation portions 12d are alternately disposed in the peripheral direction. The first spring retaining portion 12e is a spring retaining portion that supports an inner peripheral side of the coil spring 15. The inner peripheral plate-shaped portions 12f surround the center hole 12A of the inner peripheral holding plate 12.

The input plate 13 has a center hole 13A, inner peripheral plate-shaped portions 13a, the catching holes 13b, positioning portions 13c, and spring guides 13d. The inner peripheral plate-shaped portions 13a surround the center hole 13A of the input plate 13. The catching hole 13b is opened in the input plate 13. Four positioning portions 13c are installed at the same interval at outer peripheral positions of the input plate 13. The positioning portion 13c is formed in a curved shape curved in the axial direction. The positioning portion 13c extends to a curved portion of the first spring accommodation portion 12d. The spring guide 13d is formed at an outer peripheral position of the input plate 13.

Specifically, a relationship between the inner peripheral holding plate 12 and the input plate 13 is as follows. A hole diameter of the center hole 13A of the input plate 13 is smaller than a hole diameter of the center hole 12A of the inner peripheral holding plate 12. The inner peripheral plate-shaped portion 13a overlaps a connection guide 18 in the axial direction, and the inner peripheral plate-shaped portion 13a and the connection guide 18 are fixed by a second rivet 19. The connection guide 18 has a circularly annular shape, and a cross-sectional shape of the connection guide 18 is a stepped plate shape. The inner peripheral plate-shaped portion 13a and the connection guide 18 are installed to be rotatable relative to the inner peripheral plate-shaped portion 12f and have the inner peripheral plate-shaped portion 12f interposed therebetween in the axial direction. An outer peripheral end of the connection guide 18 is in slidable contact with an inner peripheral end of the annular circular plate portion 11c of the clutch hub 11.

Figure 2:
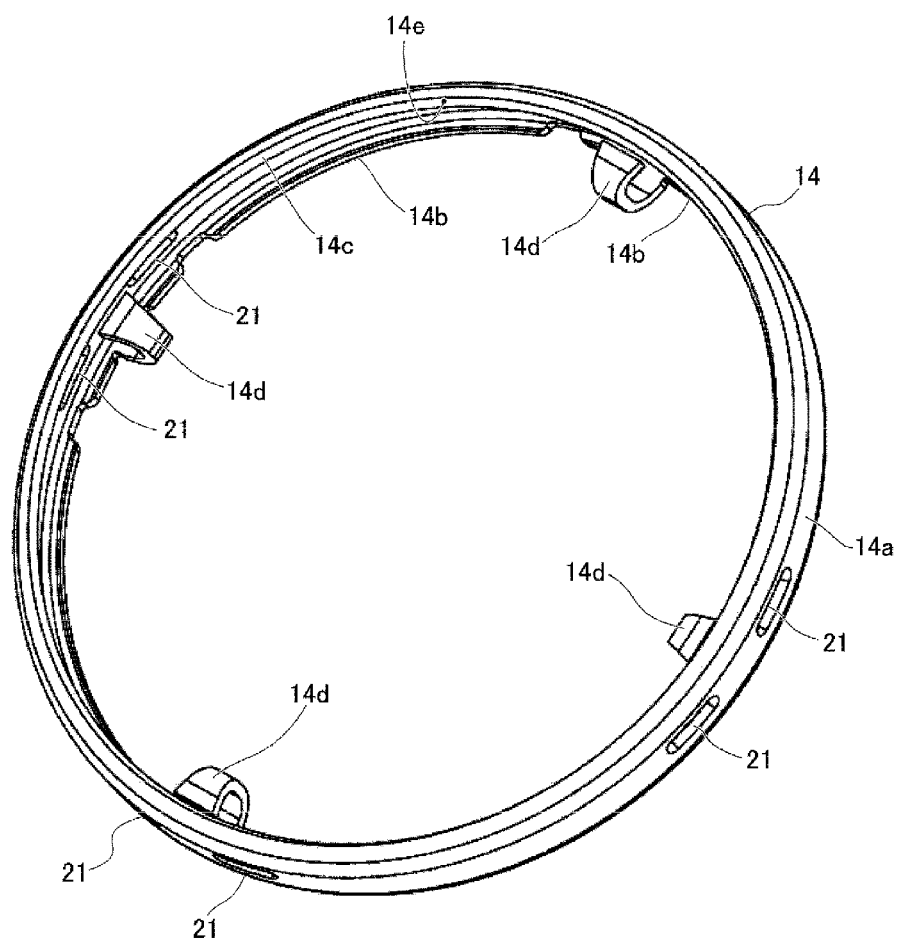
FIG. 2 is a perspective view of a back plate that is a constituent element of the torsional-vibration reducing device according to the first embodiment of the present invention.

As illustrated in FIGS. 1 to 3, the back plate 14 has a cylindrical portion 14a, a pair of circularly annular ribs 14b and 14c, second spring accommodation portions 14d, and second spring retaining portions 14e. The pair of circularly annular ribs 14b and 14c extends inward from two opposite sides of the cylindrical portion 14a. The rib 14b is disposed to be closer to the input plate 13 in the axial direction than the rib 14c. The rib 14b of the back plate 14 is fitted between the outer guide portion 12b and the inner guide portion 12c and restricts a movement in the axial direction. The back plate 14 is installed to be rotatable relative to the inner peripheral holding plate 12. The second spring accommodation portion 14d is disposed at an intermediate position of the adjacent first spring accommodation portions 12d based on the peripheral direction. Four second spring accommodation portions 14d are installed at the same interval at inner peripheral positions of the back plate 14. The second spring accommodation portion 14d protrudes inward. The second spring accommodation portion 14d is curved from one end of the cylindrical portion 14a based on the axial direction toward the other end of the cylindrical portion 14a based on the axial direction. The second spring accommodation portions 14d are installed to surround the second spring retaining portions 14e. The second spring retaining portions 14e are inner peripheral surfaces (recessed line surfaces) of recessed lines of the back plate 14 and inner peripheral surfaces (recessed line surfaces) of recessed lines of the cylindrical portion 14a and the pair of circularly annular ribs 14b and 14c. The second spring retaining portion 14e is a spring retaining portion that supports an outer peripheral side of the coil spring 15. A space between the first spring retaining portion 12e and the second spring retaining portion 14e based on the diameter direction is an accommodation space that supports the coil spring 15.

The coil spring 15 mitigates torque fluctuation generated at the input sides of the input rotation members 13 and 14 and transmits power to the output sides of the output rotation members 11 and 12. As illustrated in FIG. 1, eight coil springs 15 are installed at the same interval in the peripheral direction. The coil spring 15 is fitted in a predetermined compressed state (energy-stored state) by the first spring accommodation portion 12d and the second spring accommodation portion 14d. Specifically, the two coil springs 15 are fitted, in a predetermined compressed state (energy-stored state), between the adjacent first spring accommodation portions 12d based on the peripheral direction by one second spring accommodation portion 14d.

Further, eight coil springs 15 are supported at positions based on the diameter direction by the first spring retaining portions 12e and the second spring retaining portions 14e. The first spring retaining portions 12e and the second spring retaining portions 14e are spring retaining portions for supporting the eight coil springs 15.

The plurality of coil springs 16 is supported between the inner peripheral holding plate 12 and the input plate 13. In addition, four coil springs 16 are provided. The plurality of coil springs 16 each serve as a stopper means that restricts a relative rotation before the coil spring 15 becomes an acceptable maximum compressed state by the relative rotation between the inner peripheral holding plate 12 and the input plate 13.

Next, a distinctive configuration of the torsional-vibration reducing device 1 according to the present embodiment will be described.

As illustrated in FIGS. 1 to 4, the torsional-vibration reducing device 1 has first long holes 21 and second long holes 22.

The first long holes 21 are formed at positions of the second spring retaining portions 14e of the back plate 14, except for the plurality of second spring accommodation portions 14d. The plurality of first long holes 21 is formed in the second spring retaining portions 14e of the back plate 14 while corresponding to the maximum outer diameter position of the back plate 14. The number of first long holes 21 is eight. The two first long holes 21 are formed in a state in which one second spring accommodation portion 14d is fitted at two opposite sides based on the peripheral direction. That is, the two first long holes 21 are formed at two opposite sides position with one second spring accommodation portion 14d interposed therebetween. The first long hole 21 is a long hole (opening) having a hole diameter in the peripheral direction larger than a hole diameter in the axial direction.

The second long holes 22 are respectively formed in the four (plurality of) separated first spring retaining portions 12e of the inner peripheral holding plate 12. The number of second long holes 22 is four. The second long hole 22 is a long hole (opening) having a hole diameter in the peripheral direction larger than a hole diameter in the axial direction. In detail, the second long hole 22 has a maximum length that allows punching through punching press processing to be described below with respect to the length of the first spring retaining portion 12e in the peripheral direction. A length of the second long hole 22 in the peripheral direction is set to be longer than a length of the first long hole 21 in the peripheral direction. One second long hole 22 is formed at a communication position at which one second long hole 22 communicates with the two first long holes 21 in the diameter direction (radial direction).

Next, a method of manufacturing the torsional-vibration reducing device 1 will be described with reference to FIG. 5.

Figure 5:
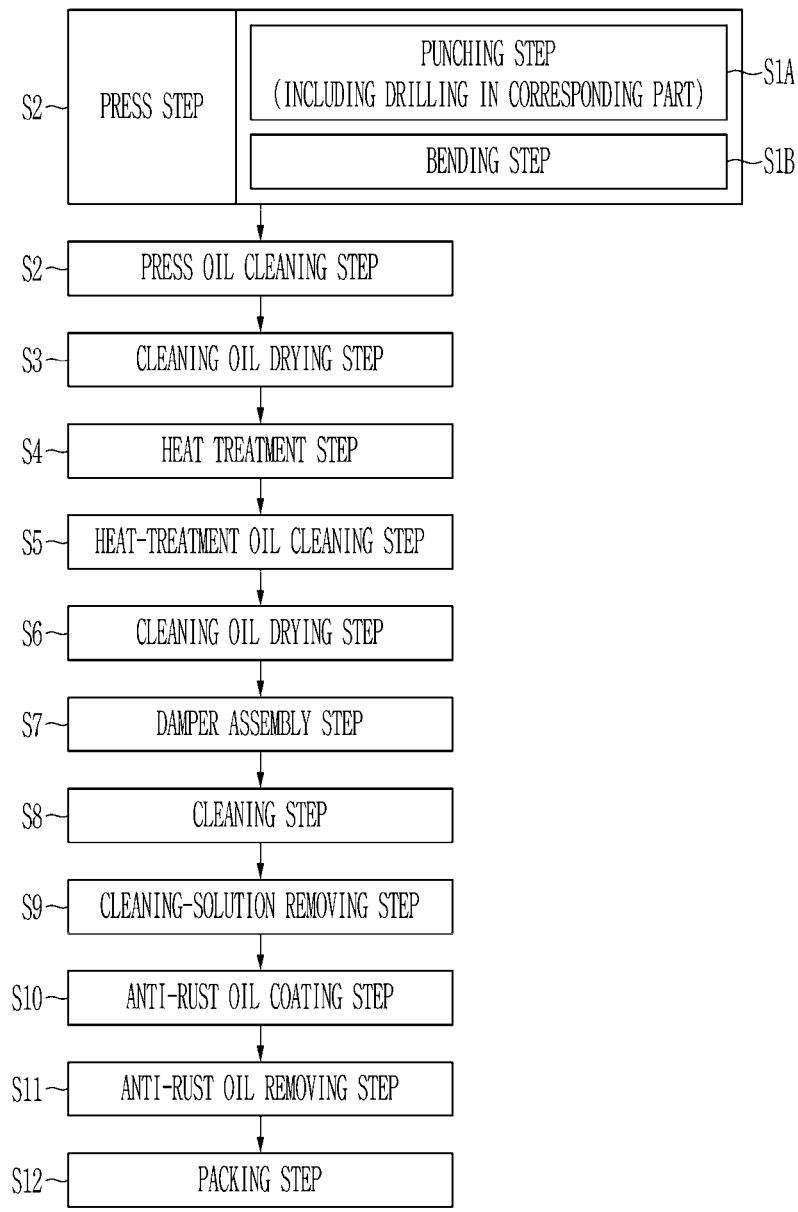
FIG. 5 is a process diagram illustrating a torsional-vibration-reducing-device manufacturing method according to the first embodiment of the present invention.

As illustrated in FIG. 5, the method of manufacturing the torsional-vibration reducing device 1 is a component manufacturing method including a press step S1, a press oil cleaning step S2, a cleaning oil drying step S3, a heat treatment step S4, a heat-treatment oil cleaning step S5, and a cleaning oil drying step S6. As illustrated in FIG. 5, the method of manufacturing the torsional-vibration reducing device 1 is a product manufacturing method including a damper assembly step S7, a cleaning step S8, a cleaning-solution removing step S9, an anti-rust oil coating step S10, an anti-rust oil removing step S11, and a packing step S12.

The press step S1 is performed by using press oil (press processing oil). The press step S1 forms the input rotation members (the input plate 13 and the back plate 14) and the output rotation members (the inner peripheral holding plate 12 and the clutch hub 11) by performing punching press processing and bending press processing on a board. The press step S1 includes a punching step S1A and a bending step S1B. The punching step S1A punches the board in a deployed component shape. The bending step S1B bends, in a predetermined component shape, the board punched by the punching step S1A.

The punching step S1A includes a long hole drilling process that makes a long hole in the outer diameter direction with respect to the rotation center line CL (see FIG. 3) at the position corresponding to the spring retaining portion for supporting the coil spring 15. Specifically, the first long hole 21 is formed at the position corresponding to the second spring retaining portion 14e of the back plate 14. Further, the second long hole 22 is formed at the position corresponding to the first spring retaining portion 12e of the inner peripheral holding plate 12.

The press oil cleaning step S2 cleans the press oil by using cleaning oil after the press step S1. The cleaning oil is oil for cleaning the press oil.

The cleaning oil drying step S3 dries the cleaning oil by raising a temperature in a vacuum state. In this case, the cleaning oil includes the press oil.

As described above, the press oil cleaning step S2 and the cleaning oil drying step S3 are performed after the press step S1. Therefore, the first long hole 21 formed in the second spring retaining portion 14e and the second long hole 22 formed in the first spring retaining portion 12e assist the passage of the cleaning oil, such that the processes of cleaning the press oil and drying the cleaning oil may be performed within a short time.

The heat treatment step S4 is performed by using heat treatment oil (quenching oil). The heat treatment step S4 performs the heat treatment on the formed input rotation members (the input plate 13 and the back plate 14) and the output rotation members (the inner peripheral holding plate 12 and the clutch hub 11). In this case, the heat treatment is a quenching treatment or an annealing treatment and converts hardness or strength into desired properties by heating and cooling material tissue of the rotation member.

The heat-treatment oil cleaning step S5 cleans the heat treatment oil by using cleaning oil after the heat treatment step S4. The cleaning oil is oil for cleaning the heat treatment oil.

The cleaning oil drying step S6 dries the cleaning oil by raising a temperature in a vacuum state. In this case, the cleaning oil includes the heat treatment oil.

As described above, the heat-treatment oil cleaning step S5 and the cleaning oil drying step S6 are performed after the heat treatment step S4. Therefore, the first long hole 21 and the second long hole 22 assist the passage of the cleaning oil, such that the processes of cleaning the heat treatment oil and drying the cleaning oil may be performed within a short time.

The damper assembly step S7 assembles a damper product. The damper product includes, as components, the heat-treated input rotation members (the input plate 13 and the back plate 14) and the heat-treated output rotation members (the inner peripheral holding plate 12 and the clutch hub 11). In addition, the damper product includes the coil spring 15 as a component.

The cleaning step S8 cleans the damper product by using a cleaning solution after the damper assembly step S7. The cleaning step S8 immerses the damper product in the cleaning solution for a predetermined time. The cleaning solution is agitated during the immersion. Next, the damper product is taken out of the cleaning solution after a predetermined time elapses. The cleaning solution is a liquid for cleaning oil or the like.

The cleaning-solution removing step S9 removes the cleaning solution remaining on the damper product after the cleaning step S8. In the cleaning-solution removing step S9, in a state in which the damper product is hung, the rotation center line CL (see FIG. 3) of the torsional-vibration reducing device 1 is maintained to be horizontal. Therefore, the cleaning solution remaining at a lower side of the torsional-vibration reducing device 1 by gravity for moving the cleaning solution flows downward by gravity. The cleaning solution flowing downward through the first long hole 21 and the second long hole 22 is discharged. Because the first long hole 21 and the second long hole 22 are provided at the communication positions, the cleaning solution is discharged from the second long hole 22 through the first long hole 21. Therefore, the cleaning solution flowing downward is quickly discharged to the outside from the torsional-vibration reducing device 1 through the first long hole 21 and the second long hole 22. In addition, the cleaning solution is removed from the damper product by power of an air flow blown by an air blower. The power of the air flow discharges a part of the cleaning solution through the first long hole 21 and the second long hole 22.

As described above, the cleaning step S8 and the cleaning-solution removing step S9 are performed after the damper assembly step S7. Therefore, the first long hole 21 and the second long hole 22 assist the passage of the cleaning solution for the damper product, such that the processes of cleaning the damper product and removing the cleaning solution may be performed within a short time.

In the anti-rust oil coating step S10, the cleaning solution attached to the damper product by the cleaning-solution removing step S9 is removed, and then the damper product is coated with anti-rust oil.

The anti-rust oil removing step S11 removes extra anti-rust oil of the anti-rust oil applied onto the damper product. In this case, in a state in which the rotation center line CL (see FIG. 3) of the damper product is maintained to be vertical, the damper product is rotated, such that the extra anti-rust oil is removed from the damper product by a centrifugal force that blows the extra anti-rust oil in the outer diameter direction. Therefore, an anti-rust oil layer is formed on a surface of the damper product.

As described above, the anti-rust oil coating step S10 and the anti-rust oil removing step S11 are performed after the cleaning-solution removing step S9 and before the packing step S12. Therefore, the first long hole 21 and the second long hole 22 assist in removing the anti-rust oil, such that the extra anti-rust oil may be removed within a short time.

The packing step S12 packs the damper product (finished product) with the anti-rust oil layer formed on the surface thereof to deliver the product.

Next, a background technology of the torsional-vibration reducing device and an operational effect of the torsional-vibration reducing device 1 according to the present embodiment will be described. First, the background technology of the torsional-vibration reducing device will be described.

In the case of the torsional-vibration reducing device, both the input rotation member and the output rotation member are configured as press-formed products, and the press processing oil is used to form the input rotation member and the output rotation member. In addition, the quenching oil is used to perform the quenching process on the holding plate and the back plate that support the coil spring. In addition, the anti-rust oil is used to perform the assembly.

In the case of the holding plate and the back plate that are device components, the oil is removed from the device component by using an oil cleaning agent (cleaning oil) after the press processing oil or the quenching oil is used. The device component is taken out of the oil cleaning agent, and then the oil cleaning agent attached to the device component is removed. To remove the oil cleaning agent, the rotation center line of the device component is maintained to be horizontal, such that the oil cleaning agent flows downward toward the lower side of the device component by gravity. In addition, a hand dryer is used to allow a liquid film, which is attached to an inner surface side of the assembled damper product without being dried, to flow downward within a short time, and the hand dryer is used to remove and dry the liquid film within a short time.

However, the back plate has a cross-sectional shape that is perpendicular to the peripheral direction and is a shape of an inner peripheral concave surface for supporting the outer periphery of the coil spring. That is, the back plate has a curved shape curved in the axial direction. Therefore, the liquid is collected on the inner peripheral concave surface of the back plate corresponding to a lower side of the assembled damper product. Because a gap between adjacent wires of the coil spring is small, the liquid is collected particularly at a portion of the coil spring corresponding to the inner peripheral concave surface. Further, even though the hand dryer is intended to be used to dry the liquid collected in the inner peripheral concave surface of the back plate, the liquid collected in the inner peripheral concave surface merely scatters in the peripheral direction without being discharged to the outside. Therefore, a large amount of time is required for drying, which causes a problem with the production process. In addition, the assembled damper product is covered by the spring guide and the back plate at two opposite sides of the coil spring. Therefore, it is difficult to apply hot air of the hand dryer to the coil spring and to remove the liquid film of the oil cleaning agent attached to the coil spring within a short time.

In addition, the anti-rust oil applied onto the assembled damper product is not removed by using the oil cleaning agent, but the extra anti-rust oil is removed. To remove the extra anti-rust oil, the rotation center line of the assembled damper product is maintained to be horizontal, such that the extra anti-rust oil flows downward by gravity. In addition, the hand dryer or the like is used to dry the extra anti-rust oil. Alternatively, the rotation axis of the assembled damper product is maintained to be vertical, and the assembled damper product is rotated, such that the extra anti-rust oil is removed by a centrifugal force, and then the extra anti-rust oil is dried. However, like the case in which the oil cleaning agent is removed after the press processing oil or the quenching oil is used, a large amount of time is required to dry the extra anti-rust oil, which causes a problem with the production process.

Next, an operational effect of the torsional-vibration reducing device 1 according to the present embodiment will be described. In contrast to the above-mentioned background technology, according to the torsional-vibration reducing device 1 according to the present embodiment, the second long hole 22 and the first long hole 21 are respectively formed in the inner peripheral holding plate 12 and the back plate 14 in the punching step S1A of the press step S1. Further, the quenching is performed, and the anti-rust oil is applied after the damper product is assembled. In the manufacturing process, the process of removing the cleaning oil for cleaning the press oil or the heat treatment oil, the process of removing the cleaning agent including oil from the damper product, and the process of removing the extra anti-rust oil are sequentially performed. In the present embodiment, the first long hole 21 and the second long hole 22 are formed in the spring retaining portion. Therefore, the process of removing the cleaning oil, the process of removing the cleaning agent including the oil, and the process of removing the extra anti-rust oil may be performed within a short time through the first long hole 21 and the second long hole 22.

More specifically, the damper product immersed in the cleaning solution to clean the damper product is taken out of the cleaning solution. Thereafter, the rotation center line CL (see FIG. 3) of the damper product is maintained to be horizontal, such that the cleaning solution attached to the surface of the device flows downward. In this case, because the first long hole 21 is provided in the back plate 14, the cleaning solution flows downward from the first long hole 21 without being collected on the second spring retaining portion 14e of the recessed line surface that is the inner peripheral surface of the back plate 14. Further, the hand dryer is used to blow hot air from the inside to the outside of the device through the second long hole 22. The blown hot air gradually moves the cleaning solution to the outside. Therefore, the liquid film of the cleaning solution attached to the inner surface side of the damper product may be discharged from the first long hole 21. Therefore, the cleaning solution may be removed within a short time. In addition, even though the press oil, which is difficult to dry and included in small amount in the cleaning solution, forms the oil film, the oil film may be removed within a short time. In addition, because the first long hole 21 is provided in the back plate 14, the weight of the entire device also decreases. Therefore, rotation strength of the back plate 14 having the first long hole 21 increases.

Therefore, the torsional-vibration reducing device 1 according to the present embodiment is advantageous in that the process of removing the cleaning solution for removing the press oil after the immerse in the cleaning solution and the process of removing the oil film such as the press oil included in the cleaning solution may be performed smoothly within a short time.

In addition, the second long hole 22 is provided in the inner peripheral holding plate 12. Therefore, the hot air of the hand dryer may be blown into the coil spring 15 through the second long hole 22. In addition, because the hot air flows out of the first long hole 21 from the second long hole 22, the liquid film of the cleaning solution attached to the inner surface side of the device may be removed within a shorter time. In addition, because the second long hole 22 is provided in the inner peripheral holding plate 12, the weight of the entire device also decreases. Therefore, rotation strength of the inner peripheral holding plate 12 having the second long hole 22 increases.

As described above, the torsional-vibration reducing device 1 and the method of manufacturing the torsional-vibration reducing device 1 according to the first embodiment obtain the effects listed below.

(1) The input rotation members (the input plate 13 and the back plate 14), the output rotation members (the inner peripheral holding plate 12 and the clutch hub 11), and the coil spring 15 are provided. The method of manufacturing the torsional-vibration reducing device 1, which mitigates torque fluctuation generated at the input side and transmits power to the output side, includes the press step S1, the heat treatment step S4, and the damper assembly step S7. The press step S1 forms the input rotation members and the output rotation members by performing punching press processing and bending press processing on a board. The heat treatment step S4 performs the heat treatment on the formed input rotation member and the formed output rotation member. The damper assembly step S7 assembles the damper product including, as components, the heat-treated input rotation members (the input plate 13 and the back plate 14), the heat-treated output rotation members (the inner peripheral holding plate 12 and the clutch hub 11), and the heat-treated coil spring 15. The press step S1 includes a hole drilling process of forming holes (the first long hole 21 and the second long hole 22) opened in the outer-diameter direction with respect to the rotation center line CL at the position corresponding to the spring retaining portion of at least one of the input rotation member and the output rotation member that supports the coil spring 15. After the damper assembly step S7, the cleaning step S8 of cleaning the damper product by using the cleaning solution and the cleaning-solution removing step S9 of removing the cleaning solution remaining after the cleaning are performed. Therefore, it is possible to provide the method of manufacturing the torsional-vibration reducing device 1, in which the holes (the first long hole 21 and the second long hole 22) formed in the spring retaining portion assist the passage of the cleaning solution for the damper product, such that the processes of cleaning the damper product and removing the cleaning solution may be performed within a short time.

(2) The press step S1 is performed by using the press oil. After the press step S1, the press oil cleaning step S2 of cleaning the press oil and the cleaning oil drying step S3 of drying the cleaning oil are performed. Therefore, the holes (the first long hole 21 and the second long hole 22) formed in the spring retaining portion assist the passage of the oil for cleaning the press oil, such that the processes of cleaning the press oil and drying the cleaning oil may be performed within a short time.

(3) The heat treatment step S4 is performed by using the heat treatment oil. After the heat treatment step S4, the heat-treatment oil cleaning step S5 of cleaning the heat treatment oil and the cleaning oil drying step S6 of drying the cleaning oil are performed. Therefore, the holes (the first long hole 21 and the second long hole 22) formed in the spring retaining portion assist the passage of the oil for cleaning the heat treatment oil, such that the processes of cleaning the heat treatment oil and drying the cleaning oil may be performed within a short time.

(4) The anti-rust oil coating step S10 of coating the damper product with the anti-rust oil and the anti-rust oil removing step S11 of removing the extra anti-rust oil of the anti-rust oil are performed after the cleaning-solution removing step S9 and before the packing process S12. Therefore, the holes (the first long hole 21 and the second long hole 22) formed in the spring retaining portion assist in removing the anti-rust oil, such that the process of removing the extra anti-rust oil may be performed within a short time.

(5) The holes formed at the position corresponding to the spring retaining portion are the long holes (the first long hole 21 and the second long hole 22) having a hole diameter in the peripheral direction larger than a hole diameter in the axial direction. Therefore, to discharge the liquid that may be collected on the inner surface of the spring retaining portion, the liquid may be more quickly discharged to the outside through the long holes (the first long hole 21 and the second long hole 22) than the circular hole.

(6) The input rotation members (the input plate 13 and the back plate 14), the output rotation members (the inner peripheral holding plate 12 and the clutch hub 11), and the coil spring 15 are provided. The torsional-vibration reducing device 1 mitigates torque fluctuation generated at the input side and transmits power to the output side. The first spring retaining portion 12e and the second spring retaining portion 14e, which support the coil spring 15, are provided on at least one of the input rotation member and the output rotation member (the back plate 14 and the inner peripheral holding plate 12). The holes (the first long hole 21 and the second long hole 22) are formed in the outer diameter direction with respect to the rotation center line CL at the positions of the first spring retaining portion 12e and the second spring retaining portion 14e. Therefore, it is possible to provide the torsional-vibration reducing device 1, in which the weights of the rotation members (the back plate 14 and the inner peripheral holding plate 12) having the holes (the first long hole 21 and the second long hole 22) are reduced, and the rotation strength of the rotation member having the hole is increased.

(7) The inner peripheral holding plate 12 having the inner peripheral side for supporting the coil spring 15 is provided as the input rotation member or the output rotation member. The hole (second long hole 22) is formed in each of the plurality of separated first spring retaining portions 12e of the inner peripheral holding plate 12, and the hole is the long hole (second long hole 22) having the hole diameter in the peripheral direction larger than the hole diameter in the axial direction. Therefore, it is possible to reduce the weight of the inner peripheral holding plate 12 having the long hole (second long hole 22) and improve the rotation strength of the inner peripheral holding plate 12 having the long hole (second long hole 22).

(8) The multi-plate clutch is connected to the output rotation member (clutch hub 11). The outer peripheral holding plate (back plate 14) having the outer peripheral side for supporting the coil spring 15 is provided as the input rotation member or the output rotation member. The hole (first long hole 21) is formed at the position of the second spring retaining portion 14e of the outer peripheral holding plate (back plate 14), and the hole is the long hole (first long hole 21) having the hole diameter in the peripheral direction larger than the hole diameter in the axial direction. Therefore, the long hole (first long hole 21) prevents abrasion powder of the multi-plate clutch from being collected at the periphery of the coil spring 15, which makes it possible to inhibit an increase in hysteresis of the coil spring 15 or the abrasion of the coil spring 15.

Second Embodiment

Figure 6:
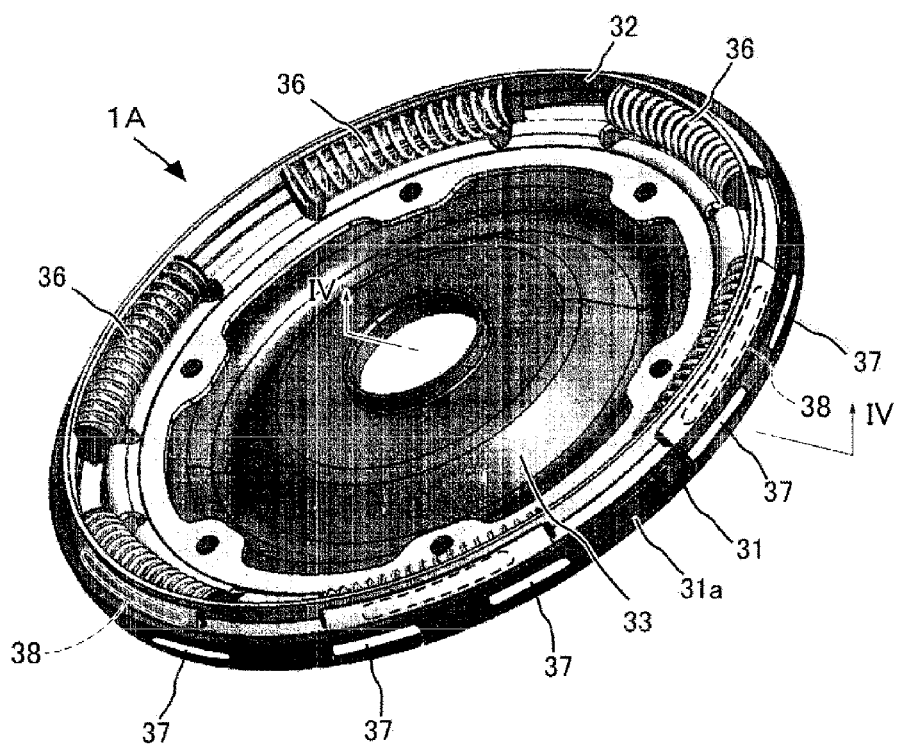
FIG. 6 is a perspective view of a torsional-vibration reducing device according to a second embodiment of the present invention.
Figure 7:
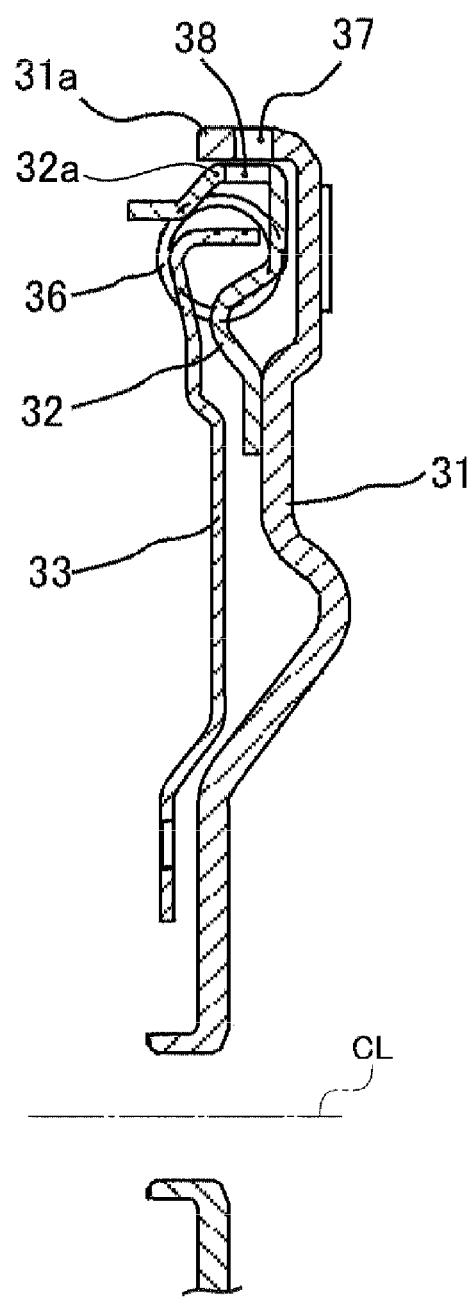
FIG. 7 is a cross-sectional view taken along line IV-IV in FIG. 6 according to the second embodiment of the present invention.

FIGS. 6 and 7 illustrate a torsional-vibration reducing device as a short travel damper according to the present embodiment. The torsional-vibration reducing device 1A includes a piston plate 31 (cover plate), an outer peripheral holding plate 32, an input rotation member 33, and coil springs 36. The piston plate 31 and the outer peripheral holding plate 32 are output rotation members.

The piston plate 31 and the outer peripheral holding plate 32 are fixed to each other. The piston plate 31 is a single-plate clutch. The piston plate 31 has a flange portion 31a at an outer peripheral position thereof. The flange portion 31a has a curved shape curved in the axial direction. The piston plate 31 overlaps the outer peripheral holding plate 32 in the diameter direction at an outer peripheral position of a spring retaining portion 32a of the outer peripheral holding plate 32. The outer peripheral holding plate 32 has the spring retaining portion 32a at an outer peripheral position thereof. The spring retaining portion 32a is positioned at a position at which the spring retaining portion 32a overlaps the flange portion 31a in the diameter direction. The spring retaining portion 32a is disposed at the inner peripheral position of the flange portion 31a. The spring retaining portion 32a is formed in a curved shape curved in the axial direction. The spring retaining portion 32a is a spring retaining portion for supporting the outer peripheral side of the coil spring 36. The flange portion 31a is a spring retaining portion for indirectly supporting the outer peripheral side of the coil spring 36. The input rotation member 33 is connected to a driving source (e.g., an engine (not illustrated)).

The coil spring 36 mitigates torque fluctuation generated at the input side of the input rotation members 33 and transmits power to the output sides of the output rotation members 31 and 32. Six coil springs 36 are installed at the same interval in the peripheral direction. The coil spring 36 is fitted in a predetermined compressed state (energy-stored state) by the outer peripheral holding plate 32 and the input rotation member 33. The outer peripheries of the six coil springs 36 are supported by the spring retaining portions 32a. The outer peripheries of the six coil springs 36 are supported indirectly by the flange portions 31a through the spring retaining portions 32a.

Like the back plate 14 in the first embodiment, the torsional-vibration reducing device 1A also has first long holes 38 and second long holes 37. The first long hole 38 and the second long hole 37 correspond to the first long holes 21 formed in the back plate 14 in the first embodiment.

The first long hole 38 is formed at a position of the spring retaining portion 32a of the outer peripheral holding plate 32. The plurality of first long holes 38 is formed in the spring retaining portion 32a while corresponding to the maximum outer diameter position of the outer peripheral holding plate 32. The number of first long holes 38 is six. One first long hole 38 is formed at an outer peripheral side of one coil spring 36. The first long hole 38 is a long hole (opening) having a hole diameter in the peripheral direction larger than a hole diameter in the axial direction.

The second long hole 37 is formed at a position of the flange portion 31a of the piston plate 31. The plurality of second long holes 37 is formed in the flange portion 31a while corresponding to the maximum outer diameter position of the piston plate 31. The number of second long holes 37 is twelve. Two second long holes 37 are formed at an outer peripheral side of one coil spring 36. The second long holes 37 are formed one by one at two opposite side positions of one first long hole 38. The second long holes 37, which are formed one by one at the two opposite side positions of one first long hole 38, at least partially overlap the first long hole 38 in the diameter direction. Therefore, the second long holes 37, which are formed one by one at the two opposite side positions of the first long hole 38, are formed at communication positions at which the second long holes 37 communicate with the first long hole 38 in the diameter direction (radial direction). The second long hole 37 is a long hole (opening) having a hole diameter in the peripheral direction larger than a hole diameter in the axial direction. A length of the second long hole 37 in the peripheral direction is set to be longer than a length of the first long hole 38 in the peripheral direction.

Next, a method of manufacturing the torsional-vibration reducing device 1A will be described with reference to FIG. 5.

Like the first embodiment, the method of manufacturing the torsional-vibration reducing device 1A includes respective processes of a component manufacturing method and respective processes of a product manufacturing method.

The press step S1 is performed by using the press oil. The press step S1 forms the input rotation member 33 and the output rotation members (the piston plate 31 and the outer peripheral holding plate 32) by performing punching press processing and bending press processing on a board. The press step S1 includes a punching step S1A and a bending step S1B. The punching step S1A punches the board in a deployed component shape. The bending step S1B bends, in a predetermined component shape, the board punched by the punching step S1A.

The punching step S1A includes a long hole drilling process that makes a long hole in the outer diameter direction with respect to the rotation center line CL (see FIG. 7) at the position corresponding to the spring retaining portion for supporting the coil spring 36. Specifically, the first long hole 38 is formed at the position corresponding to the spring retaining portion 32a of the outer peripheral holding plate 32. Further, the second long hole 37 is formed at a position at which the second long hole 37 overlaps the first long hole 38 of the spring retaining portion 32a in the diameter direction. That is, the second long hole 37 is formed in the flange portion 31a of the piston plate 31. The press oil cleaning step S2 and the cleaning oil drying step S3 are performed in the same way as those in the first embodiment.

As described above, the press oil cleaning step S2 and the cleaning oil drying step S3 are performed after the press step S1. Therefore, the first long hole 38 formed in the spring retaining portion 32a and the second long hole 37 formed in the flange portion 31a assist the passage of the cleaning oil, such that the processes of cleaning the press oil and drying the cleaning oil may be performed within a short time.

Further, the method of manufacturing the torsional-vibration reducing device 1A may be implemented when the processes from the heat treatment step S4 to the packing step S12 are replaced with those disclosed in the first embodiment. The "input rotation member (the input plate 13 and the back plate 14)" is replaced with the "input rotation member 33". The "output rotation members (the inner peripheral holding plate 12 and the clutch hub 11)" are replaced with the "output rotation members (piston plate 31 and outer peripheral holding plate 32)". The "coil spring 15" is replaced with the "coil spring 36". The "first long hole 21" is replaced with the "second long hole 37". The "second long hole 22" is replaced with the "first long hole 38". The "torsional-vibration reducing device 1" is replaced with the "torsional-vibration reducing device 1A". The "rotation center line CL (see FIG. 3)" is replaced with the "rotation center line CL (see FIG. 7)".

Next, an operational effect of the torsional-vibration reducing device 1A according to the present embodiment will be described. In contrast to the above-mentioned background technology disclosed in the first embodiment, according to the torsional-vibration reducing device 1A according to the present embodiment, the second long hole 37 and the first long hole 38 are respectively formed in the piston plate 31 and the outer peripheral holding plate 32 in the punching step S1A of the press step S1. Further, the quenching is performed, and the anti-rust oil is applied after the damper product is assembled. In the manufacturing process, the process of removing the cleaning oil for cleaning the press oil or the heat treatment oil, the process of removing the cleaning agent including oil from the damper product, and the process of removing the extra anti-rust oil are sequentially performed. In the present embodiment, the first long hole 38 and the second long hole 37 are formed in the spring retaining portion. Therefore, the process of removing the cleaning oil, the process of removing the cleaning agent including the oil, and the process of removing the extra anti-rust oil may be performed within a short time through the first long hole 38 and the second long hole 37.

More specifically, the damper product immersed in the cleaning solution to clean the damper product is taken out of the cleaning solution. Thereafter, the rotation center line CL (see FIG. 7) of the damper product is maintained to be horizontal, such that the cleaning solution attached to the surface of the device flows downward. In this case, because the second long hole 37 is provided in the piston plate 31, the cleaning solution flows downward from the second long hole 37 without being collected on the inner peripheral surface (the flange portion 31a) of the piston plate 31. Further, the hand dryer is used to blow hot air from the inside to the outside of the device through the gap between the wires of the coil spring 36 and the first long hole 38. The blown hot air gradually moves the cleaning solution to the outside. Therefore, the liquid film of the cleaning solution attached to the inner surface side of the damper product may be discharged from the second long hole 37. Therefore, the cleaning solution may be removed within a short time. In addition, even though the press oil, which is difficult to dry and included in small amount in the cleaning solution, forms the oil film, the oil film may be removed within a short time. In addition, because the second long hole 37 is provided in the piston plate 31, the weight of the entire device also decreases. Therefore, rotation strength of the piston plate 31 having the second long hole 37 increases.

Therefore, the torsional-vibration reducing device 1A according to the present embodiment is advantageous in that the process of removing the cleaning solution for removing the press oil after the immerse in the cleaning solution and the process of removing the oil film such as the press oil included in the cleaning solution may be performed smoothly within a short time.

In addition, the first long hole 38 is provided in the outer peripheral holding plate 32. Therefore, the cleaning solution flows downward from the first long hole 38 to the second long hole 37 without being collected on the spring retaining portion 32a of the outer peripheral holding plate 32. In addition, because the first long hole 38 is provided, hot air of the hand dryer may be blown to the first long hole 38 through the gap between the wires of the coil spring 36. In addition, because the hot air flows out of the second long hole 37 from the first long hole 38, the liquid film of the cleaning solution attached to the inner surface side of the device may be removed within a shorter time. In addition, because the first long hole 38 is provided in the outer peripheral holding plate 32, the weight of the entire device also decreases. Therefore, rotation strength of the outer peripheral holding plate 32 having the first long hole 38 increases.

As described above, the torsional-vibration reducing device 1A according to the second embodiment may obtain the following effects in addition to the effects (6) and (8) in the first embodiment. In addition, because the torsional-vibration reducing device 1A is manufactured by the same manufacturing method as that in the first embodiment, the effects (1) to (5) in the first embodiment may also be obtained.

(9) The cover plate (piston plate 31), which overlaps the outer peripheral holding plate 32 in the diameter direction, is provided at the outer peripheral position of the spring retaining portion 32a of the outer peripheral holding plate 32. As the long holes, the first long hole 38 is formed in the outer peripheral holding plate 32, and the second long hole 37 is formed in the cover plate (piston plate 31) and communicates with the first long hole 38 in the diameter direction. Therefore, the long holes (the first long hole 37 and the second long hole 37) prevent abrasion powder of the single-plate clutch, which is the cover plate (piston plate 31), from being collected at the periphery of the coil spring 36, which makes it possible to inhibit an increase in hysteresis of the coil spring 36 or the abrasion of the coil spring 36.

Third Embodiment

Figure 8:
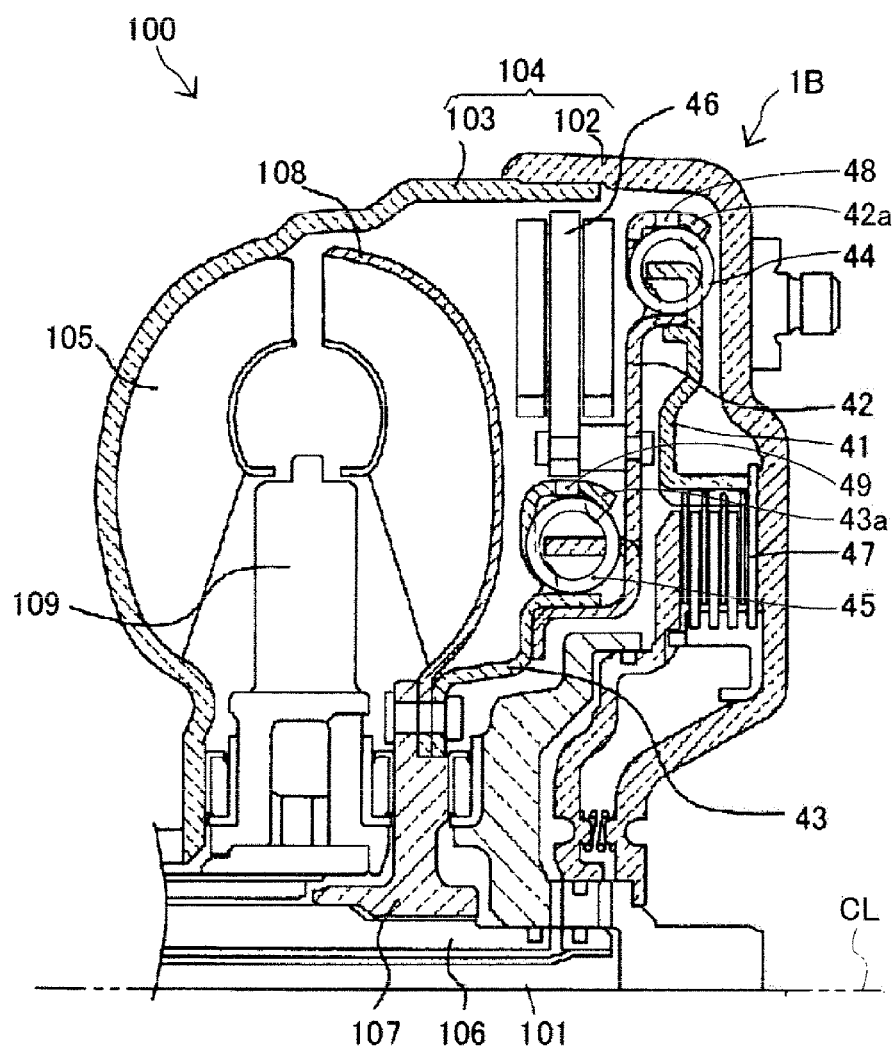
FIG. 8 is a longitudinal sectional view illustrating an upper half part based on a rotation center line that is a rotation axis of a torque converter including a torsional-vibration reducing device according to a third embodiment of the present invention.

FIG. 8 illustrates a torsional-vibration reducing device as a long travel damper. FIG. 8 is a longitudinal sectional view illustrating an upper half part based on the rotation center line CL that is a rotation axis of a torque converter including a torsional-vibration reducing device 1B. A torque converter 100 includes an inner shaft 101, a front cover 102, a pump impeller 103, a housing 104, an impeller blade 105, an outer shaft 106, a turbine hub 107, a turbine runner 108, and a stator 109. In addition, the torque converter 100 has a torsional-vibration reducing device 1B, a vibration absorber part 46, and a multi-plate clutch 47 (lock-up clutch). The inner shaft 101 has a dual shaft structure that is rotated by an engine (not illustrated). The front cover 102 is connected to the engine (not illustrated) through the inner shaft 101. The pump impeller 103 is fixed to the front cover 102. The pump impeller 103 rotates together with the front cover 102. The housing 104 is defined by the front cover 102 and the pump impeller 103. The housing 104 has an approximately disk shape. The housing 104 is charged with oil for transmitting torque. The impeller blade 105 is installed on an inner surface of the pump impeller 103. The outer shaft 106 has a dual shaft structure. The turbine hub 107 is fixed to the outer shaft 106 by spline fitting. The turbine runner 108 is supported by the turbine hub 107 and disposed at a position opposite to the impeller blade 105. The stator 109 is disposed at a position between the impeller blade 105 and the turbine runner 108. The stator 109 increases transmission torque in a casing fixed state.

The torsional-vibration reducing device 1B is installed in a space between the turbine runner 108 and the front cover 102. The vibration absorber part 46 is supported by an intermediate rotation member 42 of the torsional-vibration reducing device 1B. The multi-plate clutch 47 transmits a rotational operation (rotational driving power) inputted to the front cover 102 to an input rotation member 41 of the torsional-vibration reducing device 1B or blocks the transmission of the rotational operation. That is, the multi-plate clutch 47 transmits the rotational operation inputted to the front cover 102 to the outer shaft 106 through the torsional-vibration reducing device 1B when the clutch is engaged. Further, the multi-plate clutch 47 transmits the rotational operation inputted to the front cover 102 to the outer shaft 106 through the torque converter 100 when the clutch is disengaged.

The torsional-vibration reducing device 1B includes the input rotation member 41, the intermediate rotation member 42, an output rotation member 43, a plurality of first coil springs 44, and a plurality of second coil springs 45. The input rotation member 41 is installed inside the front cover 102. The input rotation member 41 is installed on the front cover 102 so as to be relatively rotatable. The input rotation member 41 supports a friction plate of the multi-plate clutch 47. The intermediate rotation member 42 is connected to the input rotation member 41 through the first coil spring 44 at the input side. The intermediate rotation member 42 is connected to the output rotation member 43 through the second coil spring 45 at the output side. The intermediate rotation member 42 has a first spring retaining portion 42a (an outer peripheral side spring retaining portion) at an outer peripheral position thereof. The first spring retaining portion 42a is formed in a curved shape curved in the axial direction. The first spring retaining portion 42a is a spring retaining portion that supports an outer peripheral side of the first coil spring 44. The output rotation member 43 is fixed to the turbine hub 107. The output rotation member 43 has a second spring retaining portion 43a (an outer peripheral side spring retaining portion) at an outer peripheral position thereof. The second spring retaining portion 43a is formed in a curved shape curved in the axial direction. The second spring retaining portion 43a is a spring retaining portion that supports an outer peripheral side of the second coil spring 45.

The plurality of first coil springs 44 is installed between the input rotation member 41 and the intermediate rotation member 42. That is, the input rotation member 41 is installed at the input side of the first coil spring 44, and the intermediate rotation member 42 is installed at the output side of the first coil spring 44. The first coil spring 44 mitigates torque fluctuation generated at the input side of the input rotation members 41 and transmits power to the output side of the intermediate rotation member 42. The plurality of first coil springs 44 is disposed to be closer to the outside based on the diameter direction than the plurality of second coil springs 45. An outer periphery of each of the plurality of first coil springs 44 is supported by the first spring retaining portion 42a. The plurality of second coil springs 45 is installed between the intermediate rotation member 42 and the output rotation member 43. That is, the intermediate rotation member 42 is installed at the input side of the second coil spring 45, and the output rotation member 43 is installed at the output side of the second coil spring 45. The second coil spring 45 mitigates torque fluctuation generated at the input side of the intermediate rotation members 42 and transmits power to the output side of the output rotation member 43. The plurality of second coil springs 45 is disposed to be closer to the inside based on the diameter direction than the plurality of first coil springs 44. An outer periphery of each of the plurality of second coil springs 45 is supported by the second spring retaining portion 43a. When the multi-plate clutch 47 is engaged, the first coil spring 44, the intermediate rotation member 42, and the second coil spring 45 transmit the rotation of the input rotation member 41 to the output rotation member 43 in series.

Like the back plate 14 in the first embodiment, the torsional-vibration reducing device 1B also has first long holes 48 and second long holes 49. The first long hole 48 and the second long hole 49 correspond to the first long holes 21 formed in the back plate 14 in the first embodiment.

The first long hole 48 is formed at a position of the first spring retaining portion 42a of the intermediate rotation member 42. The plurality of first long holes 48 is formed in the first spring retaining portion 42a while corresponding to the maximum outer diameter position of the intermediate rotation member 42. The first long hole 48 is formed in a portion that is in contact with the first coil spring 44 from the outside based on the diameter direction. At least one first long hole 48 is formed in the outer peripheral side of one first coil spring 44. The first long hole 48 is a long hole (opening) having a hole diameter in the peripheral direction larger than a hole diameter in the axial direction.

The second long hole 49 is formed at a position of the second spring retaining portion 43a of the output rotation member 43. The plurality of second long holes 49 is formed in the second spring retaining portion 43a while corresponding to the maximum outer diameter position of the output rotation member 43. The second long hole 49 is formed in a portion that is in contact with the second spring retaining portion 43a from the outside based on the diameter direction. At least one second long hole 49 is formed in the outer peripheral side of one second spring retaining portion 43a. The second long hole 49 is a long hole (opening) having a hole diameter in the peripheral direction larger than a hole diameter in the axial direction.

Next, a method of manufacturing the torsional-vibration reducing device 1B will be described with reference to FIG. 5.

Like the first embodiment, the method of manufacturing the torsional-vibration reducing device 1B includes respective processes of a component manufacturing method and respective processes of a product manufacturing method.

The press step S1 is performed by using the press oil. The press step S1 forms the input rotation member 41, the intermediate rotation member 42, and the output rotation member 43 by performing punching press processing and bending press processing on a board. The press step S1 includes a punching step S1A and a bending step S1B. The punching step S1A punches the board in a deployed component shape. The bending step S1B bends, in a predetermined component shape, the board punched by the punching step S1A.

The punching step S1A includes a long hole drilling process that makes long holes in the outer diameter direction with respect to the rotation center line CL (see FIG. 8) at the positions corresponding to the spring retaining portions for supporting the first coil spring 44 and the second coil spring 45. Specifically, the first long hole 48 is formed at the position corresponding to the first spring retaining portion 42a of the intermediate rotation member 42. Further, the second long hole 49 is formed at the position corresponding to the second spring retaining portion 43a of the output rotation member 43. The press oil cleaning step S2 and the cleaning oil drying step S3 are performed in the same way as those in the first embodiment. In the punching step S1A, the rotation center line CL (see FIG. 8) is a rotation center line CL when the intermediate rotation member 42 and the output rotation member 43 are embedded in the torque converter 100.

As described above, the press oil cleaning step S2 and the cleaning oil drying step S3 are performed after the press step S1. Therefore, the first long hole 48 formed in the first spring retaining portion 42a and the second long hole 49 formed in the second spring retaining portion 43a assist the passage of the cleaning oil, such that the processes of cleaning the press oil and drying the cleaning oil may be performed within a short time.

The heat treatment step S4 is performed by using the heat treatment oil. The heat treatment step S4 performs heat treatment on the formed input rotation member 41, the formed intermediate rotation member 42, and the formed output rotation member 43. The heat treatment is identical to that in the first embodiment. The heat-treatment oil cleaning step S5 and the cleaning oil drying step S6 are performed in the same way as those in the first embodiment.

As described above, the heat-treatment oil cleaning step S5 and the cleaning oil drying step S6 are performed after the heat treatment step S4. Therefore, the first long hole 48 and the second long hole 49 assist the passage of the cleaning oil, such that the processes of cleaning the heat treatment oil and drying the cleaning oil may be performed within a short time.

The damper assembly step S7 assembles a damper product. The damper product includes, as components, the heat-treated input rotation member 41, the heat-treated intermediate rotation member 42, and the heat-treated output rotation member 43. In addition, the damper product includes the first coil spring 44 and the second coil spring 45 as components. The cleaning step S8 is performed in the same way as that in the first embodiment.

The cleaning-solution removing step S9 removes the cleaning solution remaining on the damper product after the cleaning step S8. In the cleaning-solution removing step S9, in a state in which the damper product is hung, the rotation center line CL (see FIG. 8) is maintained to be horizontal. Therefore, the cleaning solution remaining at a lower side of the torsional-vibration reducing device 1B by gravity for moving the cleaning solution flows downward. Therefore, the cleaning solution flowing downward is quickly discharged to the outside from the torsional-vibration reducing device 1B through the first long hole 48 and the second long hole 49. In addition, the cleaning solution is removed from the damper product by power of an air flow blown by an air blower. In addition, the power of the air flow discharges a part of the cleaning solution through the first long hole 48 and the second long hole 49. In the cleaning-solution removing step S9, the rotation center line CL (see FIG. 8) is a rotation center line CL when the damper product is embedded in the torque converter 100.

As described above, the cleaning step S8 and the cleaning-solution removing step S9 are performed after the damper assembly step S7. Therefore, the first long hole 48 and the second long hole 49 assist the passage of the cleaning solution for the damper product, such that the processes of cleaning the damper product and removing the cleaning solution may be performed within a short time.

The anti-rust oil coating step S10 and the anti-rust oil removing step S11 are performed in the same way as those in the first embodiment. In addition, in the anti-rust oil removing step S11, the "rotation center line CL (see FIG. 3)" is replaced with the "rotation center line CL (see FIG. 8)". In the anti-rust oil removing step S11, the rotation center line CL (see FIG. 8) is a rotation center line CL when the damper product is embedded in the torque converter 100.

As described above, the anti-rust oil coating step S10 and the anti-rust oil removing step S11 are performed after the cleaning-solution removing step S9 and before the packing step S12. Therefore, the first long hole 48 and the second long hole 49 assist in removing the anti-rust oil, such that the extra anti-rust oil may be removed within a short time.

The packing step S12 packs the damper product (finished product) with the anti-rust oil layer formed on the surface thereof to deliver the product. In addition, the packing step S12 is performed at the time of delivering the damper product to a factory for assembling the torque converter 100, or the like. Further, the damper product is assembled at the time of assembling the torque converter 100 in the factory for assembling the torque converter 100. Therefore, the packing step S12 may be eliminated in case that the torque converter 100 is assembled in the factory identical to the factory that performs the steps from the press step S1 to the anti-rust oil removing step S11. In case that the packing step S12 is eliminated, the anti-rust oil coating step S10 and the anti-rust oil removing step S11 may be appropriately eliminated.

Next, an operational effect of the torsional-vibration reducing device 1B according to the present embodiment will be described. In contrast to the above-mentioned background technology disclosed in the first embodiment, according to the torsional-vibration reducing device 1B according to the present embodiment, the first long hole 48 and the second long hole 49 are respectively formed in the intermediate rotation member 42 and the output rotation member 43 in the punching step S1A of the press step S1. Further, the quenching is performed, and the anti-rust oil is applied after the damper product is assembled. In the manufacturing process, the process of removing the cleaning oil for cleaning the press oil or the heat treatment oil, the process of removing the cleaning agent including oil from the damper product, and the process of removing the extra anti-rust oil are sequentially performed. In the present embodiment, the first long hole 48 and the second long hole 49 are formed in the spring retaining portion. Therefore, the process of removing the cleaning oil, the process of removing the cleaning agent including the oil, and the process of removing the extra anti-rust oil may be performed within a short time through the first long hole 48 and the second long hole 49.

More specifically, the damper product immersed in the cleaning solution to clean the damper product is taken out of the cleaning solution. Thereafter, the rotation center line CL (see FIG. 8) of the torque converter 100 is maintained to be horizontal, such that the cleaning solution attached to the surface of the device flows downward. In this case, because the first long hole 48 is provided in the intermediate rotation member 42, the cleaning solution flows downward from the first long hole 48 without being collected on the inner peripheral surface (the first spring retaining portion 42a) of the intermediate rotation member 42. Further, the hand dryer is used to blow hot air from the inside to the outside of the device through the gap between the wires of the first coil spring 44. The blown hot air gradually moves the cleaning solution to the outside. Therefore, the liquid film of the cleaning solution attached to the inner surface side of the damper product may be discharged from the first long hole 48. Therefore, the cleaning solution may be removed within a short time. In addition, even though the press oil, which is difficult to dry and included in small amount in the cleaning solution, forms the oil film, the oil film may be removed within a short time. In addition, because the first long hole 48 is provided in the intermediate rotation member 42, the weight of the entire device also decreases. Therefore, rotation strength of the intermediate rotation members 42 having the first long hole 48 increases.

In addition, the second long hole 49 will be described. Like the case related to the first long hole 48, the damper product immersed in the cleaning solution to clean the damper product is taken out of the cleaning solution. Thereafter, the rotation center line CL (see FIG. 8) of the torque converter 100 is maintained to be horizontal, such that the cleaning solution attached to the surface of the device flows downward. In this case, because the second long hole 49 is provided in the output rotation member 43, the cleaning solution flows downward from the second long hole 49 without being collected on the inner peripheral surface (the second spring retaining portion 43a) of the output rotation member 43. Further, the hand dryer is used to blow hot air from the inside to the outside of the device through the gap between the wires of the second coil spring 45. The blown hot air gradually moves the cleaning solution to the outside. Therefore, the liquid film of the cleaning solution attached to the inner surface side of the damper product may be discharged from the second long hole 49. Therefore, the cleaning solution may be removed within a short time. In addition, even though the press oil, which is difficult to dry and included in small amount in the cleaning solution, forms the oil film, the oil film may be removed within a short time. In addition, because the second long hole 49 is provided in the output rotation member 43, the weight of the entire device also decreases. Therefore, rotation strength of the output rotation members 43 having the second long hole 49 increases.

Therefore, the torsional-vibration reducing device 1B according to the present embodiment is advantageous in that the process of removing the cleaning solution for removing the press oil after the immerse in the cleaning solution and the process of removing the oil film such as the press oil included in the cleaning solution may be performed smoothly within a short time.

As described above, the torsional-vibration reducing device 1B according to the third embodiment may obtain the following effects in addition to the effects (6) and (8) in the first embodiment. In addition, because the torsional-vibration reducing device 1B is manufactured by the same manufacturing method as that in the first embodiment, the effects (1) to (5) in the first embodiment may also be obtained.

(10) The intermediate rotation member 42 is provided between the input rotation member 41 and the output rotation member 43. The first coil spring 44 is provided between the input rotation member 41 and the intermediate rotation member 42. The second coil spring 45 is provided between the intermediate rotation member 42 and the output rotation member 43. As the long holes, the first long hole 48 is formed in the outer peripheral side spring retaining portion (first spring retaining portion 42a) of the intermediate rotation member 42, and the second long hole 49 is formed in the outer peripheral side spring retaining portion (second spring retaining portion 43a) of the output rotation member 43. Therefore, the long hole (first long hole 48) prevents abrasion powder of the multi-plate clutch 47 from being collected at the periphery of the first coil spring 44, which makes it possible to inhibit an increase in hysteresis of the first coil spring 44 or the abrasion of the first coil spring 44.

The torsional-vibration-reducing-device manufacturing method and the torsional-vibration reducing device according to the present invention have been described above based on the first embodiment, the second embodiment, and the third embodiment. However, the specific configurations are not limited by these embodiments, and modifications and additions of design can be made without departing from the subject matters of the present invention claimed in respective claims.

In the first to third embodiments, the examples have been described in which in the cleaning-solution removing step S9, the cleaning solution remaining on the damper product is removed by gravity and power of an air flow. In addition, the example has been described in which in the anti-rust oil removing step S11, the extra anti-rust oil is removed by a centrifugal force. However, the present invention is not limited thereto. In the cleaning-solution removing step S9, the centrifugal force may remove the cleaning solution remaining on the damper product. In the anti-rust oil removing step S11, the gravity and the power of the air flow may remove the extra anti-rust oil. In addition, the power of the air flow may not be used in case that the gravity may remove the cleaning solution or the extra anti-rust oil. In addition, the power of the air flow may remove the cleaning solution or the extra anti-rust oil in case that the centrifugal force cannot remove the cleaning solution or the extra anti-rust oil. For example, the cleaning solution or the extra anti-rust oil may be removed by at least one of the gravity, the power of the air flow, and the centrifugal force. Therefore, the cleaning solution or the extra anti-rust oil may be quickly discharged to the outside through the first long hole and the second long hole.

In the first to third embodiments, the examples have been described in which in the cleaning oil drying step S3 and the cleaning oil drying step S6, the cleaning oil is dried by raising a temperature in a vacuum state. However, the present invention is not limited thereto. In the cleaning oil drying step S3 and the cleaning oil drying step S6, the cleaning oil may be removed by at least one of the gravity, the power of the air flow, and the centrifugal force. Therefore, the cleaning oil may be quickly discharged to the outside through the first long hole and the second long hole.

In the first to third embodiments, the examples have been described in which the two long holes are formed (drilled). That is, in the first embodiment, the example has been described in which the first long hole 21 and the second long hole 22 are formed. In the second embodiment, the example has been described in which the first long hole 38 and the second long hole 37 are formed. In the third embodiment, the example has been described in which the first long hole 48 and the second long hole 49 are formed. However, the present invention is not limited thereto. For example, any one of the first long hole and the second long hole may be formed as a long hole, or a third long hole or the like may be formed in addition to the first long hole and the second long hole, such that three or more long holes may be formed.

In the first to third embodiments, the example has been described in which the hole is formed as a long hole. The example has been described in which the long hole is a long opening having a hole diameter in the peripheral direction larger than a hole diameter in the axial direction. However, the present invention is not limited thereto. For example, a plurality of small holes may be formed in a portion where the long hole is formed. The shape of the hole may be a perfectly circular shape or an approximately circular shape. For example, the hole may not be formed as a long hole.

The first to third embodiments disclose the examples of the torsional-vibration reducing devices 1, 1A, and 1B applied to the torque converter. However, the torsional-vibration reducing device according to the present invention may be applied as a damper device, without being limited to a torque converter, installed in, for example, a driving power transmission system, such as a hybrid vehicle, equipped with no torque converter, and configured to inhibit torque fluctuation.

CROSS-REFERENCE TO RELATED APPLICATION

The present application claims priority to and the benefit of Japanese Patent Application No. 2020-083167 filed with the Japanese Patent Office on May 11, 2020, the entire contents of which are incorporated herein by reference.

EXPLANATION OF REFERENCE NUMERALS AND SYMBOLS 1, 1A, 1B: Torsional-vibration reducing device
11: Clutch hub (output rotation member)
12: Inner peripheral holding plate (output rotation member)
12a: Bent piece
12b: Outer guide portion
12c: Inner guide portion
12d: First spring accommodation portion
12e: First spring retaining portion
12f: Inner peripheral plate-shaped portion
13: Input plate (input rotation member)
13a: Inner peripheral plate-shaped portion
13b: Catching hole
13c: Positioning portion
13d: Spring guide
14: Back plate (input rotation member, outer peripheral holding plate)
14a: Cylindrical portion
14b, 14c: Rib
14d: Second spring accommodation portion
14e: Second spring retaining portion
15: Coil spring
16: Coil spring
17: First rivet
18: Connection guide
19: Second rivet
21: First long hole
22: Second long hole
31: Piston plate (output rotation member, single-plate clutch, cover plate)
31a: Flange portion
32: Outer peripheral holding plate (output rotation member)
32a: Spring retaining portion
33: Input rotation member
36: Coil spring
37: Second long hole
38: First long hole
41: Input rotation member
42: Intermediate rotation member
42a: First spring retaining portion (outer peripheral side spring retaining portion)
43: Output rotation member
43a: Second spring retaining portion (outer peripheral side spring retaining portion)
44: First coil spring
45: Second coil spring
46: Vibration absorber part
47: Multi-plate clutch
48: First long hole
49: Second long hole
100: Torque converter
101: Inner shaft
102: Front cover
103: Pump impeller
104: Housing
105: Impeller blade
106: Outer shaft
107: Turbine hub
108: Turbine runner
109: Stator

The invention claimed is:

1. A device for reducing torsional vibration comprising:
an inner peripheral holding plate;
an input plate;
a back plate; and
coil springs which torque fluctuation generated at input sides of the input plate and the back plate, and transmit power to an output side of the inner peripheral holding plate,
wherein the inner peripheral holding plate, the input plate, and the back plate are installed side by side in a concentric shape, the input plate is connected to the back plate, and the inner peripheral holding plate and the back plate support the coil spring,
wherein the inner peripheral holding plate includes a center hole, bent pieces, outer guide portions, inner guide portions, first spring accommodation portions, first spring retaining portions, and inner peripheral plate-shaped portions, the bent pieces protruding in an axial direction from an edge of the center hole and being inserted into catching holes of the input plate, the outer guide portions being disposed outside of the back plate based on the axial direction, the inner guide portions being disposed inside the back plate based on the axial direction, the outer guide portions and the inner guide portions extending from an outer peripheral edge of the inner peripheral holding plate, the first spring accommodation portions being installed at a same interval at outer peripheral positions of the inner peripheral holding plate and being formed in a curved shape from a position extending outward in a radial direction, the first spring retaining portions being installed at a same interval at outer peripheral positions of the inner peripheral holding plate, the first spring retaining portions and the first spring accommodation portions being alternately disposed in a peripheral direction, each of the first spring retaining portion being a spring retaining portion that supports an inner peripheral side of the one of the coil springs, and the inner peripheral plate-shaped portions surrounding the center hole of the inner peripheral holding plate,
wherein the input plate includes a center hole, inner peripheral plate-shaped portions, the catching holes, positioning portions, and spring guides, the inner peripheral plate-shaped portions surrounding the center hole of the input plate, the catching holes being opened in the input plate, the positioning portions being installed at a same interval at outer peripheral positions of the input plate, being formed in a curved shape curved in the axial direction, and extending to a curved portion of the first spring accommodation portions, and the spring guides being formed at an outer peripheral position of the input plate,
wherein the back plate includes a cylindrical portion, first and second circularly annular ribs, second spring accommodation portions, and second spring retaining portions, the first and second circularly annular ribs extending inward from two opposite sides of the cylindrical portion, the first rib being disposed to be closer to the input plate in the axial direction than the second rib, the first rib being fitted between the outer guide portions and the inner guide portions and restricting a movement in the axial direction, the second spring accommodation portions being disposed at an intermediate position of the adjacent first spring accommodation portions based on the peripheral direction, the second spring accommodation portions being installed at a same interval at inner peripheral positions of the back plate and protruding inward, the second spring accommodation portions being curved from a first end of the cylindrical portion based on the axial direction toward a second end of the cylindrical portion based on the axial direction, the second spring accommodation portions surrounding the second spring retaining portions, the second spring retaining portions being inner peripheral surfaces of recessed lines of the back plate, the second spring retaining portions supporting an outer peripheral side of the coil springs, a space between one of the first spring retaining portions and one of the second spring retaining portions being based on the radial direction being an accommodation space, wherein each of the coil springs is fitted in a predetermined compressed state by one of the first spring accommodation portions and one of the second spring accommodation portions, and wherein a first hole is formed at a position corresponding to one of the spring retaining portions of the back plate, and a second hole is formed at one of the first spring retaining portions of the inner peripheral holding plate, a diameter of the second hole in the peripheral direction being larger than a diameter of the first hole in the peripheral direction, the first hole and second hole communicating in the radial direction.

2. The device of claim 1, wherein the first hole is a long hole which is lar peripheral direction larger than in the axial direction.

3. The device of claim 1, wherein a multi-plate clutch or a single-plate clutch is connected to the inner peripheral holding plate.

* * * * *